United States Patent
Kuroda et al.

(10) Patent No.: US 11,990,617 B2
(45) Date of Patent: May 21, 2024

(54) LITHIUM METAL COMPOSITE OXIDE POWDER, POSITIVE ELECTRODE ACTIVE SUBSTANCE FOR LITHIUM SECONDARY BATTERY, POSITIVE ELECTRODE, AND LITHIUM SECONDARY BATTERY

(71) Applicant: SUMITOMO CHEMICAL COMPANY, LIMITED, Tokyo (JP)

(72) Inventors: Tomoya Kuroda, Fukui (JP); Yuichiro Imanari, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 782 days.

(21) Appl. No.: 16/979,415

(22) PCT Filed: Mar. 13, 2019

(86) PCT No.: PCT/JP2019/010297
§ 371 (c)(1),
(2) Date: Sep. 9, 2020

(87) PCT Pub. No.: WO2019/177032
PCT Pub. Date: Sep. 19, 2019

(65) Prior Publication Data
US 2021/0083286 A1    Mar. 18, 2021

(30) Foreign Application Priority Data
Mar. 13, 2018    (JP) .................................. 2018-045955

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/364* (2013.01); *H01M 4/505* (2013.01);
(Continued)

(58) Field of Classification Search
CPC ...... H01M 4/525; H01M 4/364; H01M 4/505; H01M 10/0525; H01M 2004/021;
(Continued)

(56) References Cited

U.S. PATENT DOCUMENTS 9,130,212 B1 * 9/2015 Kokado .............. H01M 4/131
2004/0091778 A1    5/2004 Ozaki et al.
(Continued)

FOREIGN PATENT DOCUMENTS

CN    106450155 A    2/2017
CN    106463721 A    2/2017
(Continued)

OTHER PUBLICATIONS

WO2016148096A1[ english translation of CN-107406274-A] as taught by Inoue (Year: 2016).*
(Continued)

*Primary Examiner* — Cynthia H Kelly
*Assistant Examiner* — Tarik J Phillip
(74) *Attorney, Agent, or Firm* — Rimon P.C.

(57) ABSTRACT

A lithium metal composite oxide powder including: secondary particles that are aggregates of primary particles, and single particles that are present independently of the secondary particles, wherein the lithium metal composite oxide is represented by composition formula (I), and the single particles have an average crushing strength exceeding 80 MPa:

$$Li[Li_x(Ni_{(1-y-z-w)}Co_yMn_zM_w)_{1-x}]O_2 \qquad (I)$$

(Continued)

wherein M is one or more metal elements selected from the group consisting of Fe, Cu, Ti, Mg, Al, W, B, Mo, Nb, Zn, Sn, Zr, Ga, La and V, $-0.1 \leq x \leq 0.2$, $0 \leq y \leq 0.4$, $0 \leq z \leq 0.4$, and $0 \leq w \leq 0.1$.

10 Claims, 1 Drawing Sheet

(51) Int. Cl.
*H01M 4/36* (2006.01)
*H01M 4/505* (2010.01)
*H01M 10/0525* (2010.01)
*H01M 4/02* (2006.01)

(52) U.S. Cl.
CPC ..... *H01M 10/0525* (2013.01); *C01P 2004/03* (2013.01); *C01P 2004/61* (2013.01); *C01P 2004/62* (2013.01); *H01M 2004/021* (2013.01); *H01M 2004/028* (2013.01)

(58) Field of Classification Search
CPC .......... H01M 2004/028; H01M 10/052; C01G 53/50; C01G 53/006; C01G 53/42; C01P 2004/03; C01P 2004/61; C01P 2004/62; C01P 2002/20; C01P 2002/52; C01P 2002/76; C01P 2004/45; C01P 2004/51; C01P 2004/60; C01P 2006/21; C01P 2006/40; Y02E 60/10
See application file for complete search history.

(56) References Cited

U.S. PATENT DOCUMENTS

| | | | |
|---|---|---|---|
| 2011/0003206 A1 | 1/2011 | Yura et al. | |
| 2016/0164093 A1 | 6/2016 | Inoue et al. | |
| 2016/0248090 A1* | 8/2016 | Maeda | H01M 4/525 |
| 2017/0187031 A1 | 6/2017 | Kurita et al. | |
| 2017/0288221 A1 | 10/2017 | Kobayashi et al. | |
| 2017/0288223 A1 | 10/2017 | Ogawa et al. | |
| 2019/0260024 A1 | 8/2019 | Nakamura et al. | |
| 2019/0330072 A1 | 10/2019 | Imanari et al. | |
| 2021/0028453 A1 | 1/2021 | Imanari et al. | |

FOREIGN PATENT DOCUMENTS

| | | | | |
|---|---|---|---|---|
| EP | 2447214 | A2 | 5/2012 | |
| JP | 07-142056 | A | 6/1995 | |
| JP | 2004-087492 | A | 3/2004 | |
| JP | 2004-193115 | A | 7/2004 | |
| JP | 2004-220897 | A | 8/2004 | |
| JP | 2004-355824 | A | 12/2004 | |
| JP | 2010-070431 | A | 4/2010 | |
| JP | 2010-212260 | A | 9/2010 | |
| JP | 2012-099470 | A | 5/2012 | |
| JP | 2012-126633 | A | 7/2012 | |
| JP | 2013-082581 | A | 5/2013 | |
| JP | 2015-026455 | A | 2/2015 | |
| JP | 2016-149258 | A | 8/2016 | |
| JP | 2016-157677 | A | 9/2016 | |
| JP | 2017-188443 | A | 10/2017 | |
| JP | 2017-188445 | A | 10/2017 | |
| JP | 6256956 | B1 | 1/2018 | |
| WO | 2016/129361 | A1 | 8/2016 | |
| WO | WO-2016148096 | A1 * | 9/2016 | ............ C01G 53/00 |
| WO | 2017/169129 | A1 | 10/2017 | |
| WO | 2018/020845 | A1 | 2/2018 | |
| WO | 2018/043671 | A1 | 3/2018 | |

OTHER PUBLICATIONS

Third party observation issued in corresponding Korean Application No. 10-2020-7025818, dated Apr. 18, 2023, with partial English translation, 13 pages.
Korean Notification issued in corresponding Korean Patent Application No. 10-2020-7025818, dated Oct. 28, 2022, with partial English translation.
Extended European Search Report issued in coresponding European Patent Application No. 19766519.3-1108, dated Nov. 12, 2021.
Chinese Third Party Observation issued in corresponding Chinese Patent Application No. 201980018099.9, dated Mar. 24, 2021, with partial English translation.
European Third Party Observation issued in corresponding European Patent Application No. 19766519.3, dated Apr. 15, 2021.
Chinese Office Action issued in corresponding Chinese Patent Application No. 201980018099.9, dated Jun. 8, 2023, with English translation.
European Third Party Observation issued in corresponding European Patent Application No. 19766519.3, dated Jun. 23, 2023.
International Search Report issued in corresponding International Patent Application No. PCT/JP2019/010297, dated Apr. 9, 2019, with English translation.
Japanese Notice of Reasons for Refusal issued in corresponding Japanese Patent Application No. 2018-045955, dated Jan. 29, 2019, with English translation.
Japanese Decision of Rejection issued in corresponding Japanese Patent Application No. 2018-045955, dated May 14, 2019, with English translation.
Office Action received in corresponding Chinese Patent Application No. 201980018099.9, dated Oct. 25, 2023.
Chinese Office Action issued in corresponding Chinese Patent Application No. 201980018099.9, dated Dec. 1, 2022, with English translation.
Chinese Notification issued in corresponding Chinese Patent Application No. 201980018099.9, dated Apr. 27, 2023, with English summary.

\* cited by examiner

LITHIUM METAL COMPOSITE OXIDE POWDER, POSITIVE ELECTRODE ACTIVE SUBSTANCE FOR LITHIUM SECONDARY BATTERY, POSITIVE ELECTRODE, AND LITHIUM SECONDARY BATTERY

CROSS REFERENCE TO RELATED APPLICATIONS

This application is the U.S. National Phase under 35 U.S.C. § 371 of International Application No. PCT/JP2019/010297, filed on Mar. 13, 2019, which claims the benefit of Japanese Application No. 2018-045955, filed on Mar. 13, 2018, the entire contents of each are hereby incorporated by reference.

TECHNICAL FIELD

The present invention relates to a lithium metal composite oxide powder, a positive electrode active material for a lithium secondary battery, a positive electrode, and a lithium secondary battery.

DESCRIPTION OF RELATED ART

A lithium metal composite oxide powder is used as the positive electrode active material for lithium secondary batteries. Lithium secondary batteries have already been put to practical use not only as compact power supplies for portable telephones, notebook computers and the like, but also as medium- or large-sized power supplies for automobile use, electric power storage use, etc.

The powder of lithium metal composite oxide may include primary particles and secondary particles formed by aggregation of the primary particles. When the lithium metal composite oxide powder is used as the positive electrode active material for lithium secondary batteries, the lithium metal composite oxide powder comes in contact with the electrolyte on the surface of the primary particles as well as on the surface of and inside the secondary particles, causing lithium ions to be extracted from the particles during charging and lithium ions to be inserted into the particles during discharging. Since the surface state of the particles affects the extraction and insertion of lithium ions, controlling the surface state of the primary or secondary particles of the lithium metal composite oxide powder is important for improving battery performance in terms of cycle performance, battery energy density, etc.

For example, Patent Document 1 describes a lithium composite oxide powder formed of monodisperse primary particles (corresponding to the single particles in the present invention) including one element selected from the group consisting of cobalt, nickel and manganese as well as lithium as the main constituents. The lithium composite oxide described in Patent Document 1 has specific average particle diameter, specific surface area, and bulk density, and is free of aggregated particles. Patent Document 1 describes that a lithium composite oxide formed of monodisperse primary particles eliminates grain boundaries and is less prone to breakage and fracture during molding of the positive electrode active material and the like.

PRIOR ART REFERENCES

Patent Document

Patent Document 1: Japanese Unexamined Patent Application Publication No. 2004-355824

SUMMARY OF THE INVENTION

Problems to be Solved by the Invention

As described in Patent Document 1, lithium composite oxides composed of monodisperse primary particles are less prone to breakage and fracture than secondary particles.

On the other hand, during the use of secondary batteries, a new surface may be generated due to slight cracks at the particle interfaces. The surface of the particles generated as a new surface becomes a reaction site with the electrolyte. In this reaction site, a decomposition reaction of the electrolytic solution occurs, and gas may be generated. The generated gas causes battery swelling.

The present invention has been made in view of the above-mentioned circumstances, and the object of the present invention is to provide a lithium metal composite oxide powder with less generation of gas, which can suppress battery swelling, a positive electrode active material for a lithium secondary battery containing the lithium metal composite oxide powder, a positive electrode using the active material, and a lithium secondary battery using the positive electrode.

Means to Solve the Problems

Specifically, the present invention is as enumerated in [1] to [6] below.

[1] A lithium metal composite oxide powder comprising: secondary particles that are aggregates of primary particles, and single particles that are present independently of the secondary particles, wherein the lithium metal composite oxide is represented by composition formula (I), and the single particles have an average crushing strength exceeding 80 MPa:

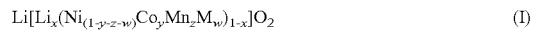

$$Li[Li_x(Ni_{(1-y-z-w)}Co_yMn_zM_w)_{1-x}]O_2 \qquad (I)$$

wherein M is one or more metal elements selected from the group consisting of Fe, Cu, Ti, Mg, Al, W, B, Mo, Nb, Zn, Sn, Zr, Ga, La and V, $-0.1 \leq x \leq 0.2$, $0 \leq y \leq 0.4$, $0 \leq z \leq 0.4$, and $0 \leq w \leq 0.1$.

[2] The lithium metal composite oxide powder according to [1], wherein in the composition formula (I), $0 < x \leq 0.1$ and $0 < y \leq 0.4$.

[3] The lithium metal composite oxide powder according to [1] or [2], which has 90% cumulative volumetric particle diameter $D_{90}$, 10% cumulative volumetric particle diameter $D_{10}$, and 50% cumulative volumetric particle size $D_{50}$, which satisfy a ratio, $(D_{90}-D_{10})/D_{50}$, of less than 2.0.

[4] The lithium metal composite oxide powder according to any one of [1] to [3], wherein the single particles have an average particle diameter of 0.5 μm or more and 7 μm or less.

[5] A positive electrode active material for a lithium secondary battery, including the lithium metal composite oxide powder of any one of [1] to [4].

[6] A positive electrode including a positive electrode active material of [5].

[7] A lithium secondary battery including the positive electrode of [6].

Effect of the Invention

The present invention can provide a lithium metal composite oxide powder with less generation of gas, which can suppress battery swelling, a positive electrode active material for a lithium secondary battery, a positive electrode using the active material, and a lithium secondary battery using the positive electrode.

DESCRIPTION OF THE EMBODIMENTS

Figure 1A:
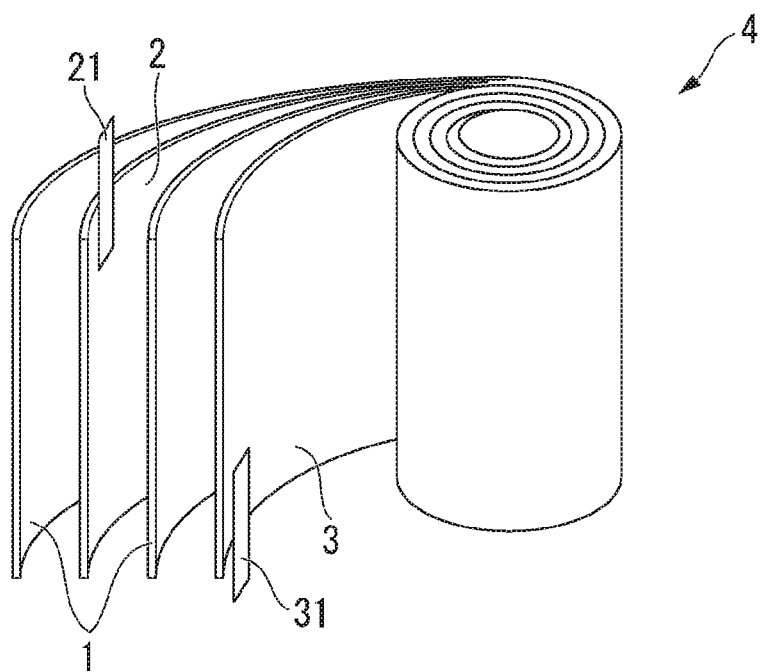
FIG. 1A is a schematic view showing one example of a lithium ion secondary battery.

In the present invention, the term "primary particle" means a particle that has no observable grain boundaries and is a constituent of a secondary particle.

In the present invention, the term "secondary particle" means a particle formed by aggregation of the primary particles.

In the present invention, the term "single particle" means a particle that exists independently of the primary particles or the secondary particles and has no observable grain boundaries.

<Lithium Metal Composite Oxide Powder>

The present embodiment relates to a lithium metal composite oxide powder including secondary particles that are aggregates of primary particles, and single particles that are present independently of the secondary particles.

That is, the lithium metal composite oxide powder of the present embodiment includes independently existing single particles. The lithium metal composite oxide of the present embodiment is represented by the composition formula (I) below. Further, in the lithium metal composite oxide powder of the present embodiment, the independently existing single particles have an average crushing strength exceeding 80 MPa.

$$\text{Li}[\text{Li}_x(\text{Ni}_{(1-y-z-w)}\text{Co}_y\text{Mn}_z\text{M}_w)_{1-x}]\text{O}_2 \quad \quad (I)$$

wherein M is one or more metal elements selected from the group consisting of Fe, Cu, Ti, Mg, Al, W, B, Mo, Nb, Zn, Sn, Zr, Ga, La and V, $-0.1 \leq x \leq 0.2$, $0 \leq y \leq 0.4$, $0 \leq z \leq 0.4$, and $0 \leq w \leq 0.1$.

The lithium metal composite oxide powder of the present embodiment includes the independently existing single particles that have an average crushing strength exceeding 80 MPa. In other words, the single particles contained in the lithium metal composite oxide powder of the present embodiment have a structure ensuring high particle strength. Such single particles do not have grain boundaries within the particles and are less prone to particle breakage. This results in less likelihood of generation of a new surface due to particle breakage. This means that possible decomposition reactions with the electrolyte on the new surface are less likely to occur. That is, the present embodiment can provide a lithium metal composite oxide powder with less generation of gas, which can suppress battery swelling.

The decomposition electricity is a value having correlation with suppression of gas generation inside a battery.

The present embodiment can reduce the occurrence of the decomposition electricity (also referred to as "float electricity") observed when an irreversible reaction with the electrolyte occurs at the particle interface.

<Measurement of Decomposition Electricity>

In the present embodiment, the decomposition electricity is a value measured by the following method.

A lithium secondary battery (coin-type cell) is fabricated using the positive electrode active material containing the lithium metal composite oxide powder of the present embodiment. The positive electrode used is produced as follows. A positive electrode active material containing the lithium metal composite oxide powder of this embodiment, a conductive material (acetylene black) and a binder (PVdF) are mixed and kneaded so as to obtain a composition wherein positive electrode active material:conductive material:binder=92:5:3 (mass ratio), thereby preparing a paste-like positive electrode mix. The obtained paste-like positive electrode mix is applied to one side of a 40 μm-thick Al foil as a current collector, using an applicator. The resulting is dried, and then pressed at a pressure of 125 kN/m so as to have the positive electrode mix stuck to the Al foil. The resulting electrode is punched into a disc of 14.5 mm in diameter, and used for producing the cell.

More specifically, the obtained positive electrode is placed on a bottom lid of a coin cell for a coin-type battery R2032 (manufactured by Hohsen Corporation) with the aluminum foil surface facing downward, and a laminate film separator (including a heat-resistant porous layer laminated on a polyethylene porous film (thickness: 25 μm)) is placed on the positive electrode. 300 μl of an electrolytic solution is injected thereinto. The electrolytic solution used is prepared by dissolving $\text{LiPF}_6$ in a mixture of ethylene carbonate, dimethyl carbonate and ethyl methyl carbonate with a volume ratio of 30:35:35 such that the amount of $\text{LiPF}_6$ becomes 1.0 mol/L.

Next, metal lithium used as a negative electrode is placed on the laminate film separator, covered with a top lid through a gasket, and swaged using a swage, thereby producing a lithium secondary battery (coin-type battery R2032).

Further, the resulting coin-type cell is tested as follows.

Specifically, a constant current/constant voltage charging is performed with a test temperature of 60° C., a maximum charge voltage of 4.3V, a charge time of 60 hours, and a charge current of 0.05 CA.

During the constant current/constant voltage charging, the electricity accumulated during 30 hours after shifting to the 4.3V constant-voltage mode is measured and calculated as the float electricity (mAh/g).

In the present embodiment, the float electricity measured by the method described above is preferably 1.00 to 9.80 (mAh/g), more preferably 2.00 to 9.50 (mAh/g), and even more preferably 3.00 to 9.00 (mAh/g).

<<Average Crushing Strength>>

In the present embodiment, the "average crushing strength" of the single particles present in the lithium metal composite oxide powder means a value measured by the following method.

First, with respect to the lithium metal composite oxide powder, test pressure (load) is applied to one arbitrarily selected single particle using a compressive strength tester ("micro compression tester MCT-510", manufactured by Shimadzu Corporation) to measure the deformation amount of the single particle. With the test force (P) being defined as a pressure value at which, when the test pressure is gradually raised, the deformation amount becomes maximum while the test pressure remains almost constant, the crushing strength (St) is calculated by the following equation (A) (Journal of the Mining and Metallurgical Institute of Japan, vol. 81 (1965)). This procedure is performed with respect to total of five arbitrarily selected particles, and the average crushing strength is calculated as an average of the obtained five values of the crushing strength.

$$St=2.8\times P/(\pi\times d\times d)(d: \text{single particle diameter}) \quad \quad (A)$$

As for the single particle diameter (d) in the equation (A), the single particle used in the measurement is observed with a microscope annexed to the compressive strength tester, an average between the distance between parallel lines drawn from a certain direction so as to sandwich the single particle, and the distance between parallel lines perpendicular to those mentioned above drawn so as to sandwich the single particle is calculated, and this average value is used as the single particle diameter (d).

As the single particle to be measured, a single particle having an approximately equal length (major axis) to the average diameter of the single particles is selected. The expression "approximately equal length" means a length of 80 to 120% of the average particle diameter of the single particles. The average particle diameter of the single particles can be determined by the method described below and is preferably determined prior to the crushing strength measurement.

In the present embodiment, the average crushing strength of the independently existing single particles exceeds 80 MPa, and is preferably 100 MPa or more, more preferably 110 MPa or more, particularly preferably 120 MPa or more. As long as the effect of the present invention can be achieved, the upper limit of the average crushing strength of the single particles is not particularly limited, but is, for example, preferably 500 MPa or less, more preferably 450 MPa or less, and even more preferably 400 MPa or less.

For example, the crushing strength is preferably 100 MPa or more and 500 MPa or less, more preferably 110 MPa or more and 450 MPa or less, and even more preferably 120 MPa or more and 400 MPa or less or less.

When the average crushing strength of the single particles is not less than the lower limit described above, the single particles have high particle strength, which is unlikely to be broken, for example, even when the volume change occurs due to repeated charging and discharging, or during the press for forming the positive electrode.

<<Composition Formula (I)>>

The lithium metal composite oxide of the present embodiment is represented by formula (I) below:

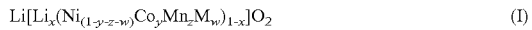

$$Li[Li_x(Ni_{(1-y-z-w)}Co_yMn_zM_w)_{1-x}]O_2 \quad (I)$$

wherein M is one or more metal elements selected from the group consisting of Fe, Cu, Ti, Mg, Al, W, B, Mo, Nb, Zn, Sn, Zr, Ga, La and V, $-0.1 \leq x \leq 0.2$, $0 \leq y \leq 0.4$, $0 \leq z \leq 0.4$, and $0 \leq w \leq 0.1$.

For obtaining a lithium secondary battery with excellent cycle performance, x in the formula (I) is preferably more than 0, more preferably 0.01 or more, and still more preferably 0.02 or more. For obtaining a lithium secondary battery with higher initial coulombic efficiency, x in the formula (I) is preferably 0.1 or less, more preferably 0.08 or less, and still more preferably 0.06 or less.

The upper limit values and lower limit values of x can be arbitrarily combined.

For example, x is preferably more than 0 and 0.2 or less, more preferably 0.1 or less, still more preferably 0.01 or more and 0.08 or less, and particularly preferably 0.02 or more and 0.06 or less.

In the context of the present specification, the term "cycle performance" refers to a battery's ability to resist the capacity decrease due to repeated charge/discharge, which is defined in terms of a ratio of the capacity measured after charge/discharge to the initial capacity.

For obtaining a lithium secondary battery having low internal resistance, y in the composition formula (I) is preferably more than 0, more preferably 0.005 or more, even more preferably 0.01 or more, and particularly preferably 0.05 or more. For obtaining a lithium secondary battery with high thermal stability, y in the composition formula (I) is preferably 0.35 or less, and more preferably 0.33 or less.

The upper limit values and lower limit values of y can be arbitrarily combined.

For example, y is preferably more than 0 and 0.4 or less, more preferably 0.005 or more and 0.35 or less, still more preferably 0.01 or more and 0.35 or less, and particularly preferably 0.05 or more and 0.33 or less.

In the present embodiment, it is preferable that $0 < x \leq 0.1$ and $0 < y \leq 0.4$ in the composition formula (I).

For obtaining a lithium secondary battery with higher cycle performance, z in the formula (I) is preferably 0.01 or more, more preferably 0.02 or more, and still more preferably 0.1 or more. For obtaining a lithium secondary battery with higher storage stability under high temperature conditions (e.g., at 60° C.), z in the formula (I) is preferably 0.39 or less, more preferably 0.38 or less, and still more preferably 0.35 or less.

The upper limit values and lower limit values of z can be arbitrarily combined.

For example, z is preferably 0.01 or more and 0.39 or less, more preferably 0.02 or more and 0.38 or less, and still more preferably 0.1 or more and 0.35 or less.

For obtaining a lithium secondary battery having low internal resistance, w in the composition formula (I) is preferably more than 0, more preferably 0.0005 or more, and even more preferably 0.001 or more. For obtaining a lithium secondary battery with higher discharge capacity at high current rate, w in the composition formula (I) is preferably 0.09 or less, more preferably 0.08 or less, and still more preferably 0.07 or less.

The upper limit values and lower limit values of w can be arbitrarily combined.

For example, w is preferably more than 0 and 0.09 or less, more preferably 0.0005 or more and 0.08 or less, and still more preferably 0.001 or more and 0.07 or less.

In the present embodiment, the value of y+z+w in the composition formula (I) is preferably less than 0.5, and more preferably 0.3 or less. The lower limit of y+z+w is not particularly limited as long as the effects of the present invention can be obtained, but is preferably 0.05 or more, and more preferably 0.1 or more.

The upper limit and the lower limit of y+z+w can be arbitrarily combined.

For example, the value of y+z+w is preferably 0.05 or more and less than 0.5, and more preferably 0.1 or more and 0.3 or less.

M in the composition formula (I) represents one or more metals selected from the group consisting of Fe, Cu, Ti, Mg, Al, W, B, Mo, Nb, Zn, Sn, Zr, Ga and V.

M in the composition formula (I) is preferably at least one metal selected from the group consisting of Ti, Mg, Al, W, B and Zr for obtaining a lithium secondary battery with higher cycle performance, and is preferably at least one metal selected from the group consisting of Ti, Al, W, B and Zr for obtaining a lithium secondary battery with higher thermal stability.

In the present embodiment, w, x, y, and z in the composition formula (I) described above can be determined by dissolving the powder of the lithium composite metal compound in hydrochloric acid and then analyzing the resulting with an inductively coupled plasma emission spectrometer (SPS3000, manufactured by SII Nano Technology Corporation).

In the present embodiment, the lithium metal composite oxide powder preferably has 90% cumulative volumetric particle diameter $D_{90}$, 10% cumulative volumetric particle diameter $D_{10}$, and 50% cumulative volumetric particle size $D_{50}$, which satisfy a ratio, $(D_{90}-D_{10})/D_{50}$, of less than 2.0.

The cumulative particle dimeter can be measured by the laser diffraction scattering method.

First, 0.1 g of the lithium metal composite oxide powder is added to 50 ml of 0.2% by mass aqueous solution of sodium hexametaphosphate, thereby obtaining a dispersion with the powder dispersed therein.

Next, the particle size distribution of the obtained dispersion is measured using a laser diffraction/scattering particle size distribution analyzer (Microtrac MT3300EXII manufactured by MicrotracBel Corporation) to obtain a volume-based cumulative particle size distribution curve.

In the obtained cumulative particle size distribution curve, with the proviso that the total volume is 100%, the particle size at a 10% cumulated volume measured from the smallest particle side is determined as the 10% cumulative volumetric particle diameter $D_{10}$ (μm), the particle size at a 50% cumulated volume measured from the smallest particle side is determined as the 50% cumulative volumetric particle diameter $D_{50}$ (μm), and the particle size at a 90% cumulated volume measured from the smallest particle side is determined as the 90% cumulative volumetric particle diameter $D_{90}$ (μm).

In the present embodiment, $(D_{90}-D_{10})/D_{50}$ is preferably 1.9 or less, and more preferably 1.8 or less. The lower limit of $(D_{90}-D_{10})/D_{50}$ is not particularly limited as long as the effects of the present invention can be obtained, but is, for example, preferably 0.1 or more, more preferably 0.3 or more, and even more preferably 0.5 or more.

The upper limit and the lower limit of $(D_{90}-D_{10})/D_{50}$ can be arbitrarily combined.

For example, the aforementioned $(D_{90}-D_{10})/D_{50}$ is preferably 0.1 or more and 2.0 or less, more preferably 0.3 or more and 1.9 or less, and even more preferably 0.5 or more and 1.8 or less.

When $(D_{50}-D_{10})/D_{50}$ is not more than the upper limit described above, higher filling of the positive electrode active material in the positive electrode is achieved and the energy density of the battery is increased.

In the present embodiment, the average particle diameter of the single particles is preferably 0.5 μm or more, more preferably 0.75 μm or more, and still more preferably 1.0 μm or more. Further, the average particle diameter of the single particles is preferably 7 μm or less, more preferably 6 μm or less, and still more preferably 5 μm or less.

The upper limit values and lower limit values can be arbitrarily combined. In the present embodiment, particularly, the average particle diameter of the single particles is preferably 0.5 μm or more and 7 μm or less, more preferably 0.75 μm or more and 6 μm or less, and even more preferably 1 μm or more and 5 μm or less.

When the average particle diameter of the single particle is not less than the lower limit described above, the handling of the positive electrode active material is improved.

When the average particle diameter of the single particles is not more than the upper limit described above, the discharge capacity at a high current rate is improved.

In the present embodiment, the secondary particle diameter is preferably 2 pin or more, more preferably 3 μm or more, and still more preferably 4 μm or more. Further, the secondary particle diameter is preferably 20 μm or less, more preferably 18 pin or less, and still more preferably 16 μm or less.

The upper limit values and lower limit values can be arbitrarily combined. In the present embodiment, particularly, the average particle diameter of the secondary particles is preferably 2 μm or more and 20 μm or less, more preferably 3 μm or more and 18 μm or less, and even more preferably 4 μm or more and 16 μm or less. When the average particle diameter of the secondary particles is not less than the lower limit described above, higher filling of the positive electrode active material in the positive electrode is achieved and the energy density of the battery is increased. When the average particle diameter of the secondary particles is not more than the upper limit described above, the discharge capacity at a high current rate is improved.

The primary particles aggregate to form secondary particles and, hence, are not particles that have grown large. The average particle diameter of the primary particles is about 0.1 μm or more and less than 0.5 μm.

In the present embodiment, the average particle diameter of the single particles is determined by the following method.

First, the lithium metal composite oxide powder is placed on a conductive sheet attached onto a sample stage, and SEM observation is carried out by radiating an electron beam with an accelerated voltage of 20 kV using a scanning electron microscope (JSM-5510, manufactured by JEOL Ltd.). 50 single particles are arbitrarily selected in an image (SEM photograph) obtained from the SEM observation, parallel lines are drawn from a certain direction so as to sandwich the projection image of each single particle, and the distance between the parallel lines (Feret diameter) is measured as the particle diameter of the single particle. The arithmetic average value of the obtained particle diameters is taken as the average particle diameter of the single particles in the lithium metal composite oxide powder.

Alternatively, for example, the average particle diameter of the single particles may also be determined by the following method.

50 single particles are arbitrarily selected in an image (SEM photograph) obtained from the aforementioned SEM observation, parallel lines are drawn so as to sandwich the projection images of the single particles, and the largest distance between the parallel lines is measured with respect to each of the single particles to determine the particle diameters of the single particles. The arithmetic average value of the obtained particle diameters of the single particles can be taken as the average particle diameter of the single particles in the lithium metal composite oxide powder.

Average Particle Diameter of Secondary Particles

The "average particle diameter" of the secondary particles in the lithium metal composite oxide powder can be measured by the same method as the aforementioned method for measuring the average particle diameter of the single particles.

Average Particle Diameter of Primary Particles

For measuring the "average particle diameter" of the primary particles constituting the secondary particles, first, one of the primary particles constituting the secondary particles is arbitrarily selected in an image (SEM photograph) obtained from the SEM observation, parallel lines are drawn so as to pass through the boundaries with neighboring primary particles, and the distance between the parallel lines (Feret diameter) is measured as the particle diameter of the primary particle. The particle diameters are measured in this manner with respect to 50 primary particles arbitrarily selected, and the arithmetic average value of the obtained particle diameters is taken as the average particle diameter of the primary particles constituting the secondary particles in the lithium metal composite oxide powder.

(Layered Structure)

In the present embodiment, the crystal structure of the positive electrode active material is a layered structure, and more preferably a hexagonal crystal structure or a monoclinic crystal structure.

The hexagonal crystal structure belongs to any one of the space groups selected from the group consisting of P3, $P3_1$, $P3_2$, R3, P-3, R-3, P312, P321, $P3_112$, P321, $P3_212$, $P3_221$, R32, P3m1, P31m, P3c1, P31c, R3m, R3c, P-31m, P-31c, P-3m1, P-3c, R-3m, R-3c, P6, $P6_1$, $P6_5$, $P6_2$, $P6_4$, $P6_3$, P-6, P6/m, P63/m, P622, $P6_122$, $P6_522$, $P6_222$, $P6_422$, $P6_322$, P6 mm, P6cc, $P6_3$cm, $P6_3$mc, P-6m2, P-6c2, P-62m, P-62c. P6/mmm, P6/mcc, $P6_3$/mcm, and $P6_3$/mmc.

The monoclinic crystal structure belongs to any one of the space groups selected from the group consisting of P2, $P2_1$, C2, Pm, Pc, Cm, Cc, P2/m, $P2_1$/m, C2/m, P2/c, $P2_1$/c, and C2/c.

Among the aforementioned crystal structures, from the viewpoint of obtaining a lithium secondary battery having high discharge capacity, the particularly preferable crystal structure is a hexagonal crystal structure belonging to R-3m or a monoclinic crystal structure belonging to C2/m.

<Method for Producing Lithium Metal Composite Oxide Powder]

For producing the lithium metal composite oxide powder of the present embodiment, it is preferable that a metal composite compound is first prepared, which includes metals other than lithium, i.e., at least Ni, and at least one optional metal selected from Co, Mn, Fe. Cu, Ti, Mg, Al, W. B, Mo, Nb, Zn, Sn. Zr, Ga, La and V, and then the metal composite compound is calcined together with a suitable lithium salt and an inert melting agent. As the metal composite compound, it is preferable to use a metal composite hydroxide or a metal composite oxide. Hereinbelow, as to one example of the method for producing the lithium metal composite oxide powder, explanations are made separately on the step of producing the metal composite compound and the step of producing the lithium metal composite oxide.

(Step of Producing Metal Composite Compound)

The metal composite compound can be produced by the conventionally known batch co-precipitation method or continuous co-precipitation method.

Hereinbelow, the method for producing the metal composite compound is explained taking as an example the case of production of a metal composite hydroxide containing nickel, cobalt and manganese as metals.

A nickel salt solution, a cobalt salt solution, a manganese salt solution and a complexing agent are reacted by the continuous method described in Japanese Patent Unexamined Publication No. 2002-201028 to produce a metal composite hydroxide represented by $Ni_{(1-y-z-w)}Co_yMn_z(OH)_2$ (wherein $0 \le y \le 0.4$, $0 \le z \le 0.4$, $0 \le w \le 0.1$) by the co-precipitation method.

There is no particular limitation with respect to a nickel salt as a solute in the aforementioned nickel salt solution. For example, at least one of nickel sulfate, nickel nitrate, nickel chloride and nickel acetate can be used. As a cobalt salt as a solute in the cobalt salt solution, for example, at least one of cobalt sulfate, cobalt nitrate, cobalt chloride and cobalt acetate can be used. As a manganese salt as a solute in the manganese salt solution, for example, at least one of manganese sulfate, manganese nitrate, manganese chloride and manganese acetate can be used. These metal salts are used in a ratio corresponding to the composition ratio of the aforementioned $Ni_{(1-y-z-w)}Co_yMn_z(OH)_2$. That is, the amount of each metal salt is set such that the molar ratio of nickel, cobalt, and manganese in the mixed solution containing the above metal salts matches (1-y-z-w):y:z in the composition formula (I) for the lithium metal composite oxide.

As a solvent, water can be used.

The complexing agent is a substance capable of forming a complex with ions of nickel, cobalt and manganese in an aqueous solution, the examples of which include an ammonium ion donor (ammonium sulfate, ammonium chloride, ammonium carbonate, ammonium fluoride, etc.), hydrazine, ethylenediaminetetraacetic acid, nitrilotriacetic acid, uracil diacetate and glycine. The complexing agent may be omitted, and when the complexing agent is used, the amount of the complexing agent contained in a mixture containing the nickel salt solution, the cobalt salt solution, the manganese salt solution, and the complexing agent is, for example, more than 0 and 2.0 or less, in terms of a molar ratio thereof relative to the total number of moles of the metal salts.

For adjusting the pH value of the aqueous solution during the precipitation, if necessary, an alkali metal hydroxide (such as sodium hydroxide or potassium hydroxide) may be added.

Successive addition of the aforementioned nickel salt solution, cobalt salt solution and manganese salt solution as well as the complexing agent to a reaction vessel allows nickel, cobalt and manganese to react with each other, resulting in the generation of $Ni_{(1-y-z-w)}Co_yMn_z(OH)_2$. The reaction is performed with the temperature in the reaction vessel being regulated, for example, within the range of 20° C. to 80° C., preferably 30° C. to 70° C., and the pH value at 40° C. in the reaction vessel being regulated, for example, within the range of 9 to 13, preferably 11 to 13, while appropriately agitating the content of the reaction vessel. The reaction vessel is one which allows the overflow for separation of the precipitated reaction product.

With respect to various properties of the lithium metal composite oxide to be finally obtained as a result of carrying out the process as described below, i.e., secondary particle diameter, and pore radius, such properties can be regulated by appropriately controlling the concentrations of the metal salts to be supplied to the reaction vessel, agitation speed, reaction temperature, reaction pH, and calcination conditions described below, and the like. Various gases such as inert gases (e.g., nitrogen, argon and carbon dioxide), oxidizing gases (e.g., air and oxygen) or a mixture thereof may be added to the reaction vessel as well in addition to the control of the aforementioned conditions. As a substance for promoting the oxidation state other than gases, peroxides such as hydrogen peroxide, peroxide salts such as permanganate, perchlorate, hypochlorite, nitric acid, halogen, ozone, etc. can be used. As a substance for promoting the reduction state other than gases, organic acids such as oxalic acid and formic acid, sulfites, hydrazine, etc. can be used.

For example, a higher reaction pH in the reaction vessel tends to result in generation of a metal composite compound with smaller secondary particle diameter. On the other hand, a lower reaction pH tends to result in generation of a metal composite compound with larger secondary particle diameter. Further, a higher oxidation state in the reaction vessel tends to result in generation of a metal composite compound having a large number of voids. On the other hand, a lower oxidation state tends to result in generation of a dense metal composite compound. The reaction conditions can be optimized while monitoring the various physical properties of the final lithium composite oxide to be obtained since the optimal reaction conditions may vary depending on the size of the reaction vessel used, etc.

After the reaction as described above, the resulting precipitate of the reaction product is washed with water and, then, dried, followed by isolation of a nickel-cobalt-manganese composite hydroxide as the nickel-cobalt-manganese composite compound. If necessary, the resulting reaction precipitate may be rinsed with weak acid water or an alkaline solution containing sodium hydroxide or potassium hydroxide.

In the above example, a nickel-cobalt-manganese composite hydroxide is produced; however, a nickel-cobalt-manganese composite oxide may be produced instead. The nickel-cobalt-manganese composite oxide can be prepared by, for example, performing a step of bringing the coprecipitate slurry as described above into contact with an oxidizing agent or a step of heat-treating the nickel-cobalt-manganese composite oxide.

(Step for Producing Lithium Metal Composite Oxide)

After drying the metal composite compound (metal composite oxide or metal composite hydroxide), the dried product is mixed with a lithium salt to obtain a mixture. In the present embodiment, it is preferable that an inert melting agent is also mixed with the dried product and the lithium salt.

By calcining the resulting inert melting agent-containing mixture containing the metal composite oxide or the metal composite hydroxide, the lithium salt and the inert melting agent, the mixture is allowed to be calcined in the presence of the inert melting agent. The calcination of the mixture in the presence of the inert melting agent enables suppression of the formation of secondary particles as sintered products of the primary particles. Further, the growth of the single particles can be promoted.

The drying conditions are not particularly limited, and may be, for example, any of the following conditions: conditions under which the metal composite oxide or the metal composite hydroxide is not oxidized nor reduced (i.e., conditions where an oxide remains to be an oxide, and a hydroxide remains to be a hydroxide), conditions under which the metal composite hydroxide is oxidized (i.e., conditions where a hydroxide is oxidized into an oxide), and conditions under which the metal composite oxide is reduced (i.e., conditions where an oxide is reduced into a hydroxide). For providing conditions which do not cause oxidation nor reduction, an inert gas such as nitrogen, helium or argon may be used. For providing conditions which oxidize the metal composite hydroxide, oxygen or air may be used. Further, for providing conditions which reduce the metal composite oxide, a reducing agent such as hydrazine or sodium sulfite may be used in an inert gas atmosphere. As the lithium salt, any of lithium carbonate, lithium nitrate, lithium acetate, lithium hydroxide, lithium hydroxide hydrate and lithium oxide may be used individually or in the form of a mixture of two or more of these lithium salts.

After drying the metal composite oxide or the metal composite hydroxide, the resulting may be subjected to appropriate classification. The aforementioned lithium salt and the metal composite hydroxide are used in respective amounts determined in view of the composition ratio of the end product. For example, when using a nickel-cobalt-manganese composite hydroxide, the lithium salt and the metal composite hydroxide are used in a ratio corresponding to the composition ratio of $LiNi_{(1-y-z-w)}Co_yMn_zO_2$, wherein $0 \leq y \leq 0.4$, $0 \leq z \leq 0.4$, and $0 \leq w \leq 0.1$. By calcining a mixture of the nickel-cobalt-manganese composite hydroxide and the lithium salt, a lithium-nickel-cobalt-manganese composite oxide can be obtained. The calcination may be carried out in dried air, an oxygen atmosphere, an inert atmosphere or the like depending on the desired composition, and may include a plurality of heating steps if necessary.

In the present embodiment, the calcination of the mixture in the presence of an inert melting agent can facilitate the crystallization reaction of the mixture. The inert melting agent may remain in the lithium metal composite oxide powder after calcination, or may be removed by washing the mixture with water or the like after calcination. In the present embodiment, it is preferable to wash the lithium composite metal oxide after calcination with water or the like.

By adjusting the holding temperature for the calcination, the particle diameter of the single particles in the obtained lithium metal composite oxide can be controlled to fall within the preferred range of the present embodiment.

Normally, as the holding temperature increases, the particle diameter of the single particles tend to increase, resulting in smaller BET specific surface area. The holding temperature in the calcination may be adjusted appropriately in view of the type of transition metal element to be used and the types and amounts of precipitant and inert melting agent.

In the present embodiment, the setting of the holding temperature can be done in consideration of the melting point of the inert melting agent described below, and it is preferable to set the holding temperature within a range of the melting point of the inert melting agent minus 100° C. or more and the melting point of the inert melting agent plus 100° C. or less.

Specifically, the holding temperature may be within a range of 200° C. to 1150° C., and is preferably within a range of 300° C. to 1050° C., and more preferably 500° C. to 1000° C.

The time for keeping the aforementioned holding temperature may be 0.1 hour or more and 20 hours or less, and is preferably 0.5 hour or more to 10 hours or less. The rate of heating up to the holding temperature is usually between 50° C./hour and 400° C./hour, and the rate of cooling down from the holding temperature to room temperature is usually between 10° C./hour and 400° C./hour. Air, oxygen, nitrogen, argon or a mixture of these gases can be used as the atmosphere for the calcination.

The lithium metal composite oxide after the calcination is pulverized and then appropriately classified, thereby obtaining a positive electrode active material applicable to a lithium secondary battery.

The inert melting agent that can be used in the present embodiment is not limited to those that are not likely to react with the mixture during the calcination. In the present embodiment, the inert melting agent may be at least one selected from the group consisting of fluoride, chloride, carbonate, sulfate, nitrate, phosphate, hydroxide, molybdate, and tungstate of at least one element (hereinafter referred to as "A") selected from the group consisting of Na, K, Rb, Cs, Ca, Mg, Sr and Ba.

Examples of the fluoride of A include NaF (melting point: 993° C.), KF (melting point: 858° C.), RbF (melting point: 795° C.), CsF (melting point: 682° C.), $CaF_2$ (melting point: 1402° C.), $MgF_2$ (melting point: 1263° C.), $SrF_2$ (melting point: 1473° C.), and $BaF_2$ (melting point: 1355° C.).

Examples of the chloride of A include NaCl (melting point: 801° C.), KCl (melting point: 770° C.), RbCl (melting point: 718° C.), CsC (melting point: 645° C.), $CaCl_2$ (melting point: 782° C.), $MgCl_2$ (melting point: 714° C.), $SrCl_2$ (melting point: 857° C.), and $BaCl_2$ (melting point: 963° C.).

Examples of the carbonate of A include $Na_2CO_3$ (melting point: 854° C.), $K_2CO_3$ (melting point: 899° C.), $Rb_2CO_3$ (melting point: 837° C.), $Cs_2CO_3$ (melting point: 793° C.), $CaCO_3$ (melting point: 825° C.), $MgCO_3$ (melting point: 990° C.), $SrCO_3$ (melting point: 1497° C.), and $BaCO_3$ (melting point: 1380° C.).

Examples of the sulfate of A include $Na_2SO_4$ (melting point: 884° C.), $K_2SO_4$ (melting point: 1069° C.), $Rb_2SO_4$ (melting point: 1066° C.), $Cs_2SO_4$ (melting point: 1005° C.), $CaSO_4$ (melting point: 1460° C.), $MgSO_4$ (melting point: 1137° C.), $SrSO_4$ (melting point: 1605° C.) and $BaSO_4$ (melting point: 1580° C.).

Examples of the nitrate of A include $NaNO_3$ (melting point: 310° C.), $KNO_3$ (melting point: 337° C.), $RbNO_3$ (melting point: 316° C.), $CsNO_3$ (melting point: 417° C.), $Ca(NO_3)_2$ (melting point: 561° C.), $Mg(NO_3)_2$, $Sr(NO_3)_2$ (melting point: 645° C.), and $Ba(NO_3)_2$ (melting point: 596° Q.

Examples of the phosphate of A include $Na_3PO_4$ (melting point: 75° C.), $K_3PO_4$ (melting point: 1340° C.), $Rb_3PO_4$, $Cs_3PO_4$, $Ca_3(PO_4)_2$ (melting point: 1670° C.), $Mg_3(PO_4)_2$ (melting point: 1184° C.), $Sr_3(PO_4)_2$ (melting point: 1727° C.), and $Ba_3(PO_4)_2$ (melting point: 1767° C.).

Examples of the hydroxide of A include NaOH (melting point: 318° C.), KOH (melting point: 360° C.), RbOH (melting point: 301° C.), CsOH (melting point: 272° C.), $Ca(OH)_2$ (melting point: 408° C.), $Mg(OH)_2$ (melting point: 350° C.), $Sr(OH)_2$ (melting point: 375° C.), and $Ba(OH)_2$ (melting point: 853° C.).

Examples of the molybdate of A include $Na_2MoO_4$ (melting point: 698° C.), $K_2MoO_4$ (melting point: 919° C.), $Rb_2MoO_4$ (melting point: 958° C.), $Cs_2MoO_4$ (melting point: 956° C.), $CaMoO_4$ (melting point: 1520° C.). $MgMoO_4$ (melting point: 1060° C.), $SrMoO_4$ (melting point: 1040° C.), and $BaMoO_4$ (melting point: 1460° C.).

Examples of the tungstate of A include $Na_2WO_4$ (melting point: 687° C.), $K_2WO_4$ (melting point: 933° C.). $Rb_2WO_4$, $Cs_2WO_4$, $CaWO_4$ (melting point: 1620° C.), $MgWO_4$, $SrWO_4$ (melting point: 1400° C.), and $BaWO_4$.

In the present embodiment, two or more of these inert melting agents may be used. When two or more inert melting agents are used, the melting point may be lowered. Further, among these inert melting agents, for obtaining a lithium metal composite oxide powder having higher crystallinity, it is preferable to use any one or combination of the carbonate and sulfate of A and the chloride of A. Further, A is preferably one or both of sodium (Na) and potassium (K). That is, among the above, the inert melting agent is particularly preferably one or more selected from the group consisting of NaCl, KCl, $Na_2CO_3$, $K_2CO_3$, $Na_2SO_4$, and $K_2SO_4$.

The use of these inert melting agents enables adjustment of the average crushing strength of the resulting lithium metal composite oxide so as to fall within the preferred range of the present embodiment.

In the present embodiment, when either one or both of $K_2SO_4$ and $Na_2SO_4$ is used as the inert melting agent, the average crushing strength of the resulting lithium metal composite oxide can be controlled to fall within the preferred range of the present embodiment.

In the present embodiment, the amount of the inert melting agent used during the calcination may be appropriately set. For allowing the resulting lithium metal composite oxide to have an average crushing strength falling within the range of the present embodiment, the amount of the inert melting agent to be used for calcination is preferably 0.1 part by mass or more, and more preferably 1 part by mass or more, relative to 100 parts by mass of the lithium compound.

Further, the molar ratio of the inert melting agent to the total molar amount of the inert melting agent and the lithium salt [inert melting agent/(inert melting agent+lithium salt)] is preferably 0.001 to 0.5, more preferably 0.01 to 0.4, and even more preferably 0.05 to 0.3. Further, if necessary, an inert melting agent other than mentioned above may be used as well. Examples of such other melting agents include ammonium salts such as $NH_4Cl$ and $NH_4F$.

<Positive Electrode Active Material for Lithium Secondary Battery>

The present embodiment relates to a positive electrode active material for a lithium secondary battery, including the lithium metal composite oxide powder of the embodiment described above.

<Lithium Secondary Battery>

Next, a positive electrode using the positive electrode active material (for a lithium secondary battery) including the positive electrode material powder of the present embodiment, and a lithium secondary battery including the positive electrode will be described while explaining the configuration of the lithium secondary battery.

In one example of the lithium secondary battery of the present embodiment, the lithium secondary battery includes a positive electrode, a negative electrode, a separator interposed between the positive electrode and the negative electrode, and an electrolytic solution disposed between the positive electrode and the negative electrode.

Figure 1B:
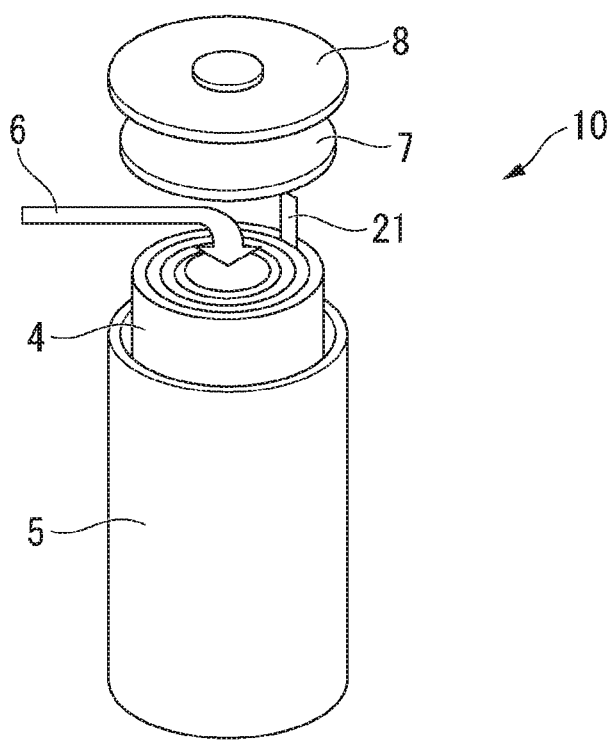
FIG. 1B is a schematic view showing one example of a lithium ion secondary battery.

Each of FIG. 1A and FIG. 1B is a schematic view illustrating an example of the lithium secondary battery of the present embodiment. A cylindrical lithium secondary battery 10 of the present embodiment is manufactured as described below.

First, as illustrated in FIG. 1A, a pair of separators 1 having a strip shape, a strip-shaped positive electrode 2 having a positive electrode lead 21 at one end, and a strip-shaped negative electrode 3 having a negative electrode lead 31 at one end are laminated in an order of the separator 1, the positive electrode 2, the separator 1, and the negative electrode 3, and are wound into an electrode group 4.

Next, as illustrated in FIG. 1B, the electrode group 4 and an insulator (not shown) are placed in a battery can 5, followed by sealing the bottom of the can, and then an electrolytic solution 6 is impregnated into the electrode group 4 such that an electrolyte is disposed between the positive electrode 2 and the negative electrode 3. Further, the top section of the battery can 5 is sealed using a top insulator 7 and a sealing body 8, whereby the lithium secondary battery 10 can be obtained.

The shape of the electrode group 4 may be, for example, of a columnar shape with its cross-section being round, oval, rectangular, or of a round-cornered rectangular shape, wherein the cross-section is perpendicular to the axis of winding of the electrode group 4.

As the shape of the lithium secondary battery including the aforementioned electrode group 4, it is possible to employ the shapes prescribed by IEC60086, which is the standard of batteries prescribed by the International Electrotechnical Commission (IEC), or JIS C 8500. Examples thereof include a cylindrical shape, an angular shape, etc.

The lithium secondary battery is not limited to the wound construction as described above, and may have a laminated construction obtained by laminating a positive electrode, a separator, a negative electrode, a separator, and so forth. Examples of the laminated lithium secondary battery include the so-called coin-type battery, button-type battery, and paper-type (or sheet-type) battery.

Hereinbelow, the respective components will be described.

(Positive Electrode)

The positive electrode of the present embodiment can be manufactured by, first, preparing a positive electrode mix including the aforementioned positive electrode active material, a conductive material and a binder, and causing the positive electrode mix to be supported on a positive electrode current collector.

(Conductive Material)

As the conductive material included in the positive electrode active material of the present embodiment, a carbonaceous material can be used. Examples of the carbonaceous material include a graphite powder, a carbon black (such as acetylene black) and a fibrous carbonaceous material. Since carbon black is in the form of microparticles and has a large surface area, the addition of only a small amount of the carbon black to the positive electrode mix increases the conductivity within the positive electrode, and improves the charge/discharge efficiency and the output performance as well; however, too large an amount of carbon black deteriorates the binding strength of the binder exerted not only between the positive electrode mix and the positive electrode current collector but also within the positive electrode mix, thereby becoming an adverse factor that increases an internal resistance.

The amount of the conductive material in the positive electrode mix is preferably 5 parts by mass or more and 20 parts by mass or less, relative to 100 parts by mass of the positive electrode active material. This amount may be decreased when using a fibrous carbonaceous material such as a graphitized carbon fiber or a carbon nanotube as the conductive material.

(Binder)

As the binder included in the positive electrode active material of the present embodiment, a thermoplastic resin can be used.

Examples of the thermoplastic resin include fluororesins such as polyvinylidene fluoride (hereinafter also referred to as PVdF), polytetrafluoroethylene (hereinafter also referred to as PTFE), ethylene tetrafluoride-propylene hexafluoride-vinylidene fluoride type copolymers, propylene hexafluoride-vinylidene fluoride type copolymers, and ethylene tetrafluoride-perfluorovinyl ether type copolymers; and polyolefin resins such as polyethylene and polypropylene.

Two or more of these thermoplastic resins may be used in the form of a mixture thereof. When a fluororesin and a polyolefin resin are used as the binder, it is possible to obtain a positive electrode mix capable of strong adhesive force relative to the positive electrode current collector as well as strong biding force within the positive electrode mix in itself by adjusting the ratio of the fluororesin to fall within the range of from 1% by mass to 10% by mass, and the ratio of the polyolefin resin to fall within the range of from 0.1% by mass to 2% by mass, based on the total mass of the positive electrode mix.

(Positive Electrode Current Collector)

As the positive electrode current collector included in the positive electrode of the present embodiment, it is possible to use a strip-shaped member composed of a metal material such as Al, Ni, or stainless steel as a component material. It is especially preferred to use a current collector which is made of Al and is shaped into a thin film because of its high processability and low cost.

Examples of the method for causing the positive electrode mix to be supported on the positive electrode current collector include a method in which the positive electrode mix is press-formed on the positive electrode current collector. Alternatively, the positive electrode mix may be caused to be supported on the positive electrode current collector by a method including producing a paste from the positive electrode mix using an organic solvent, applying the obtained paste of the positive electrode mix to at least one surface of the positive electrode current collector, drying the paste, and press-bonding the resultant to the current collector.

Examples of the organic solvent that can be used for producing the paste from the positive electrode mix include amine-based solvents such as N,N-dimethylaminopropylamine and diethylene triamine; ether-based solvent such as tetrahydrofuran; ketone-based solvents such as methyl ethyl ketone; ester-based solvents such as methyl acetate; and amide-based solvents such as dimethyl acetamide, and N-methyl-2-pyrrolidone (hereinafter, sometimes also referred to as "NMP").

Examples of the method for applying the paste of the positive electrode mix to the positive electrode current collector include a slit die coating method, a screen coating method, a curtain coating method, a knife coating method, a gravure coating method, and an electrostatic spray method.

The positive electrode can be produced by the method as described above.

(Negative Electrode)

The negative electrode included in the lithium secondary battery of the present embodiment is not particularly limited as long as it is capable of doping and de-doping lithium ions at a potential lower than the positive electrode, and examples thereof include an electrode comprising a negative electrode current collector having supported thereon a negative electrode mix including a negative electrode active material, and an electrode constituted solely of a negative electrode active material.

(Negative Electrode Active Material)

Examples of the negative electrode active material included in the negative electrode include materials which are carbonaceous materials, chalcogen compounds (oxides, sulfides, etc.), nitrides, metals or alloys, and allow lithium ions to be doped or de-doped at a potential lower than the positive electrode.

Examples of the carbonaceous materials that can be used as the negative electrode active material include graphite such as natural graphite and artificial graphite, cokes, carbon black, pyrolytic carbons, carbon fibers, and organic macromolecular compound-sintered bodies.

Examples of oxides that can be used as the negative electrode active material include oxides of silicon represented by the formula: $SiO_x$ (wherein x is an positive integer) such as $SiO_2$ and $SiO$; oxides of titanium represented by the formula: $TiO_x$ (wherein x is an positive integer) such as $TiO_2$ and $TiO$; oxides of vanadium represented by the formula: $VO_x$ (wherein x is an positive integer) such as $V_2O_5$ and $VO_2$; oxides of iron represented by the formula: $FeO_x$ (wherein x is an positive integer) such as $Fe_3O_4$, $Fe_2O_3$ and $FeO$; oxides of tin represented by the formula: $SnO_x$ (wherein x is an positive integer) such as $SnO_2$ and $SnO$; oxides of tungsten represented by the formula: $WOx$ (wherein x is an positive integer) such as $WO_3$ and $WO_2$; and metal composite oxides containing lithium and titanium or vanadium such as $Li_4Ti5O_{12}$ and $LiVO_2$.

Examples of sulfides that can be used as the negative electrode active material include sulfides of titanium represented by the formula: $TiS_x$ (wherein x is an positive integer) such as $Ti_2S_3$, $TiS_2$ and $TiS$; sulfides of vanadium represented by the formula: $VS_x$ (wherein x is an positive integer) such as $V_3S_4$, $VS_2$, and $VS$; sulfides of iron represented by the formula: $FeS_x$ (wherein x is an positive integer) such as $Fe_3S_4$, $FeS_2$ and FeS; sulfides of molybdenum represented by the formula: $MoS_x$ (wherein x is an positive integer) such as $Mo_2S_3$ and $MoS_2$; sulfides of tin represented by the formula: $SnS_x$ (wherein x is an positive integer) such as $SnS_2$ and SnS; sulfides of tungsten represented by the formula: $WS_x$ (wherein x is an positive integer) such as $WS_2$; sulfides of antimony represented by the formula: $SbS_x$ (wherein x is an positive integer) such as $Sb_2S_3$; and sulfides of selenium represented by the formula: $SeS_x$ (wherein x is an positive integer) such as $Se_5S_3$, $SeS_2$ and SeS.

Examples of nitrides that can be used as the negative electrode active material include lithium-containing nitrides such as $Li_3N$ and $Li_{3-x}A_xN$ (wherein A is one or both of Ni and Co, and 0<x<3).

Each of the aforementioned carbonaceous materials, oxides, sulfides and nitrides may be used alone or in combination. Further, each of the aforementioned carbonaceous materials, oxides, sulfides and nitrides may be crystalline or amorphous.

Examples of metals that can be used as the negative electrode active material include lithium metals, silicon metals, tin metals, etc.

Examples of alloys that can be used as the negative electrode active material include lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$.

The metals or alloys are processed into, for example, a foil, and are in many cases used alone as an electrode.

Among the aforementioned negative electrode active materials, carbonaceous materials composed mainly of graphite such as natural graphite or artificial graphite are preferably used for reasons such as follows: the potential of the negative electrode hardly changes during charging from an uncharged state to a fully charged state (the potential flatness is favorable), the average discharge potential is low, the capacity retention after repeated charge/discharge cycles is high (the cycle performance is favorable), etc. Examples of the shape of the carbonaceous material include a flake shape as in the case of natural graphite, a spherical shape as in the case of mesocarbon microbeads, a fibrous shape as in the case of a graphitized carbon fiber, an agglomerate of fine powder, etc., and the carbonaceous material may have any of these shapes.

The negative electrode mix may include a binder as necessary. As the binder, a thermoplastic resin can be used, and examples thereof include PVdF, thermoplastic polyimides, carboxymethyl cellulose, polyethylene, and polypropylene.

(Negative Electrode Current Collector)

Examples of the negative electrode current collector included in the negative electrode include a strip-shaped member composed of a metal material such as Cu, Ni or stainless steel as a component material. Among these, it is preferred to use a current collector which is made of Cu and is shaped into a thin film, since Cu is unlikely to form an alloy with lithium and can be easily processed.

Examples of the method for causing the negative electrode mix to be supported on the above-described negative electrode current collector include, as in the case of the positive electrode, a press forming method, and a method in which a paste of the negative electrode mix obtained by using a solvent etc., is applied to and dried on the negative electrode current collector, and the resulting is press-bonded to the current collector.

(Separator)

As the separator used in the lithium secondary battery of the present embodiment, for example, it is possible to use one that is formed of a material such as a polyolefin resin (e.g., polyethylene or polypropylene), a fluororesin or a nitrogen-containing aromatic polymer, and has a form of a porous film, a nonwoven fabric, a woven fabric or the like. The separator may be composed of two or more of the materials mentioned above, or may be formed by laminating these materials.

In the present embodiment, for satisfactory permeation of the electrolyte through the separator during the use (charge and discharge) of the battery, the separator preferably has an air resistance of 50 sec/100 cc or more and 300 sec/100 cc or less, more preferably 50 sec/100 cc or more and 200 sec/100 cc or less, as measured by the Gurley method prescribed in JIS P 8117: 2009.

The porosity of the separator is preferably 30% by volume or more and 80% by volume or less, and more preferably 40% by volume or more and 70% by volume or less. The separator may be a laminate of separators having different porosities.

(Electrolytic Solution)

The electrolytic solution used in the lithium secondary battery of the present embodiment contains an electrolyte and an organic solvent.

Examples of the electrolyte contained in the electrolytic solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$. $Li_2B_{10}Cl_{10}$, LiBOB (wherein "BOB" means bis(oxalato)borate), LiFSI (wherein "FSI" means bis(fluorosulfonyl)imide), a lithium salt of a lower aliphatic carboxylic acid, and $LiAlCl_4$. Two or more of these salts may be used in the form of a mixture thereof. Among these electrolytes, it is preferred to use at least one fluorine-containing salt selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$.

As the organic solvent included in the electrolyte, it is possible to use, for example, a carbonate such as propylene carbonate, ethylene carbonate, dimethyl carbonate, diethyl carbonate, ethyl methyl carbonate, 4-trifluoromethyl-1,3-dioxolane-2-one, and 1,2-di(methoxycarbonyloxy)ethane; an ether such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyl tetrahydrofuran; an ester such as methyl formate, methyl acetate, and y-butyrolactone; a nitrile such as acetonitrile and butyronitrile; an amide such as N,N-dimethyl formamide and N,N-dimethylacetoamide; a carbamate such as 3-methyl-2-oxazolidone; a sulfur-containing compound such as sulfolane, dimethyl sulfoxide, and 1,3-propane sultone; or a solvent produced by further introducing a fluoro group into the above-described organic solvent (a solvent in which one or more hydrogen atoms included in the organic solvent is substituted by a fluorine atom).

As the organic solvent, it is preferable to use a mixture of two or more of these organic solvents. Among the aforementioned organic solvents, a solvent mixture including a carbonate is preferable, and a solvent mixture of a cyclic carbonate and a non-cyclic carbonate and a solvent mixture of a cyclic carbonate and an ether are more preferable. As the solvent mixture of a cyclic carbonate and a non-cyclic carbonate, a solvent mixture including ethylene carbonate, dimethyl carbonate, and ethyl methyl carbonate is preferable. An electrolytic solution using the aforementioned solvent mixture has many advantages such as a wider operational temperature range, a low tendency of deterioration even after charge/discharge at a high current rate, a low tendency of deterioration even when used for a long period of time, and a low decomposability even when a graphite material such as natural graphite or artificial graphite is used as the active material for the negative electrode.

For improving the stability of the obtained lithium secondary battery, it is preferable to use an electrolytic solution including a lithium salt containing fluorine such as $LiPF_6$ and an organic solvent having a fluorine substituent. A solvent mixture including an ether having a fluorine substituent such as pentafluoropropyl methyl ether or 2,2,3,3-tetrafluoropropyl difluoromethyl ether and dimethyl carbonate is more preferable since a high capacity retention is achievable even when the battery is charged and discharged at a high current rate.

A solid electrolyte may be used instead of the aforementioned electrolytic solution. As the solid electrolyte, it is possible to use, for example, an organic polymer electrolyte such as a polyethylene oxide-type polymeric compound or a polymeric compound including at least one type of polymer chain selected from a polyorganosiloxane chain or a polyoxyalkylene chain. It is also possible to use the so-called gel-type electrolyte including a polymer retaining therein a non-aqueous electrolytic solution. Further, it is also possible to use an inorganic solid electrolyte including a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$. In some cases, the use of such a solid electrolyte may further improve the safety of the lithium secondary battery.

In the lithium secondary battery of the present embodiment, the solid electrolyte, when used, may serve as a separator. In such a case, the separator may be omitted.

EXAMPLES

Hereinbelow, the present invention will be described in more detail with reference to the Examples.

In the following Examples, the evaluations of the lithium metal composite oxide powder were carried out by the following method.

<Composition Analysis>

The composition analysis of the lithium metal composite oxide manufactured by the method described below was carried out using an inductively coupled plasma emission spectrometer (SPS3000, manufactured by SII Nano Technology Inc.) after the lithium metal composite oxide powder was dissolved in hydrochloric acid.

<<Measurement of Average Crushing Strength>>

The "average crushing strength" of the single particles in the positive electrode active material was measured by the following method.

First, with respect to the lithium metal composite oxide powder, test pressure (load) was applied to one arbitrarily selected single particle using "micro compression tester MCT-510", manufactured by Shimadzu Corporation to measure the deformation amount of the single particle. With the test force (P) being defined as a pressure value at which, when the test pressure was gradually raised, the deformation amount became maximum while the test pressure remained almost constant, the crushing strength (St) was calculated by Hiramatsu et al's equation (Journal of the Mining and Metallurgical Institute of Japan, vol. 81 (1965)) shown as equation (A) below. This procedure was performed with respect to total of five arbitrarily selected particles, and the average crushing strength was calculated as an average of the obtained 5 values of the crushing strength. As for the single particle diameter (d) in the equation (A), the single particle used in the measurement was observed with a microscope annexed to a micro compression tester "MCT-510", an average between the distance between parallel lines drawn from a certain direction so as to sandwich the single particle, and the distance between parallel lines perpendicular to those mentioned above drawn so as to sandwich the single particle was calculated, and this average value was used as the single particle diameter (d).

$$St=2.8 \times P/(\pi \times d \times d) (d: \text{single particle diameter}) \quad (A)$$

<<Measurement of $(D_{90}-D_{10})/D_{50}$>>

With respect to the lithium metal composite oxide powder, the ratio $(D_{90}-D_{10})/D_{50}$, wherein $D_{90}$ is 90% cumulative volumetric particle diameter, $D_{10}$ is 10% cumulative volumetric particle diameter, and $D_{50}$ is 50% cumulative volumetric particle diameter, was calculated by the following method.

First, 0.1 g of the lithium metal composite oxide powder was added to 50 ml of 0.2% by mass aqueous solution of sodium hexametaphosphate, thereby obtaining a dispersion with the powder dispersed therein.

Next, the particle size distribution of the obtained dispersion was measured using a laser diffraction/scattering particle size distribution analyzer (Microtrac MT3300EXII manufactured by MicrotracBel Corporation) to obtain a volume-based cumulative particle size distribution curve.

In the obtained cumulative particle size distribution curve, the particle size at a 10% cumulated volume measured from the smallest particle side was determined as the 10% cumulative volumetric particle diameter $D_{10}$ (μm), the particle size at a 50% cumulated volume measured from the smallest particle side was determined as the 50% cumulative volumetric particle diameter $D_{50}$ (μm), the particle size at a 90% cumulated volume measured from the smallest particle side was determined as the 90% cumulative volumetric particle diameter $D_{90}$ (μm), and the ratio $(D_{90}-D_{10})/D_{50}$ was calculated.

<<Measurement of Average Particle Diameter of Single Particles (Secondary Particles)>>

The average particle diameter of the single particles (secondary particles) was determined by the following method.

First, the lithium metal composite oxide powder was placed on a conductive sheet attached onto a sample stage, and SEM observation was carried out by radiating an electron beam with an accelerated voltage of 20 kV using a scanning electron microscope (JSM-5510, manufactured by JEOL Ltd.). 50 single particles (secondary particles) were arbitrarily selected in an image (SEM photograph) obtained from the SEM observation, parallel lines were drawn from a certain direction so as to sandwich the projection image of each single particle (secondary particle), and the distance between the parallel lines (Feret diameter) was measured as the particle diameter of the single particle (secondary particle). The arithmetic average value of the obtained particle diameters of the single particles (secondary particles) was taken as the average particle diameter of the single particles (secondary particles) in the lithium metal composite oxide powder.

<<Measurement of Average Particle Diameter of Primary Particles>>

The lithium metal composite oxide powder was placed on a conductive sheet attached onto a sample stage, and SEM observation was carried out by radiating an electron beam with an accelerated voltage of 20 kV using a scanning electron microscope (JSM-5510, manufactured by JEOL Ltd.). One of the primary particles constituting the secondary particles was arbitrarily selected in an image (SEM photograph) obtained from the SEM observation, parallel lines were drawn so as to pass through the boundaries with neighboring primary particles, and the distance between the parallel lines (Feret diameter) was measured as the particle diameter of the primary particle. The particle diameters were measured in this manner with respect to 50 primary particles arbitrarily selected, and the arithmetic average value of the obtained particle diameters was taken as the average particle diameter of the primary particles constituting the secondary particles in the lithium metal composite oxide powder.

<<Measurement of Float Electricity>>

The float electricity was measured by the following method.

A lithium secondary battery (coin-type cell) was fabricated using the positive electrode active material containing the lithium metal composite oxide powder produced by the method described below. The positive electrode used was produced as follows. A positive electrode active material containing the lithium metal composite oxide powder produced by the method described below, a conductive material (acetylene black) and a binder (PVdF) were mixed and kneaded so as to obtain a composition wherein positive electrode active material:conductive material:binder=92:5:3 (mass ratio), thereby preparing a paste-like positive electrode mix. The obtained paste-like positive electrode mix was applied to one side of a 40 μm-thick Al foil as a current collector, using an applicator. The resulting was dried, and then pressed at a pressure of 125 kN/m so as to have the positive electrode mix stuck to the Al foil. The resulting electrode was punched into a disc of 14.5 nm in diameter, and used for producing the cell.

More specifically, the obtained positive electrode was placed on a bottom lid of a coin cell for a coin-type battery R2032 (manufactured by Hohsen Corporation) with the aluminum foil surface facing downward, and a laminate film separator (including a heat-resistant porous layer laminated on a polyethylene porous film (thickness: 25 μm)) was placed on the positive electrode. 300 μl of an electrolytic solution was injected thereinto. The electrolytic solution used was prepared by dissolving $LiPF_6$ in a mixture of ethylene carbonate, dimethyl carbonate and ethyl methyl carbonate with a volume ratio of 30:35:35 such that the amount of $LiPF_6$ became 1.0 mol/L.

Next, metal lithium used as a negative electrode was placed on the laminate film separator, covered with a top lid through a gasket, and swaged using a swage, thereby producing a lithium secondary battery (coin-type battery R2032). Hereinafter, this battery may also be referred to as "coin cell".

Further, the resulting coin-type cell was tested as follows.

Specifically, a constant current/constant voltage charging was performed with a test temperature of 60° C., a maximum charge voltage of 4.3V, a charge time of 60 hours, and a charge current of 0.05 CA.

During the constant current/constant voltage charging, the electricity accumulated during 30 hours after shifting to the 4.3V constant-voltage mode was measured and calculated as the float electricity (mAh/g).

Example 1

1. Production of Positive Electrode Active Material 1

Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.60:0.20:0.20, to thereby prepare a raw material mixture solution.

Then, the obtained raw material mixture solution and an aqueous ammonium sulfate solution as a complexing agent were continuously added to the reaction vessel with stirring, and nitrogen gas was continuously passed through the reaction vessel. An aqueous solution of sodium hydroxide was dropwise added to the reaction vessel at an appropriate timing such that the pH of the solution in the reaction vessel became 11.7, thereby obtaining nickel-cobalt-manganese composite hydroxide particles. The obtained particles were washed, dehydrated by a centrifugal separator, washed, dehydrated, separated and dried at 105° C. to obtain a nickel-cobalt-manganese composite hydroxide 1.

The nickel-cobalt-manganese composite hydroxide powder 1, a lithium carbonate powder and a potassium sulfate powder were weighed such that Li/(Ni+Co+Mn)=1.20 and $K_2SO_4/(Li_2CO_3+K_2SO_4)$=0.1 (mol/mol), followed by mixing. The resulting was calcined in ambient atmosphere at 925° C. for 8 hours, thereby obtaining a lithium metal composite oxide powder. The obtained powder and pure water were mixed such that the mass ratio of the powder to the resulting mixture is 0.3, thereby obtaining a slurry. The slurry was stirred for 20 minutes, followed by dehydration, separation and drying at 105° C. to obtain a positive electrode active material 1.

2. Evaluation of Positive Electrode Active Material 1

The composition analysis of the positive electrode active material 1 was performed and the results were applied to the formula (I). As a result, it was found that x=0.02, y=0.20, z=0.20, and w=0.

The results of the SEM observation of the positive electrode active material 1 showed that the average particle diameter of the independently existing single particles was 2.0 μm, the average diameter of the secondary particles was 6.0 μm, and the average diameter of the primary particles constituting the secondary particles was 0.4 μm.

With respect to the single particles in the positive electrode active material 1, the average crushing strength was 127 MPa, $(D_{90}-D_{10})/D_{50}$ was 1.2, and the float electricity was 7.66 mAh/g.

Example 2

1. Production of Positive Electrode Active Material 2

A nickel-cobalt-manganese composite hydroxide 2 was obtained following the same procedure as in Example 1, except that an aqueous nickel sulphate solution, a cobalt sulphate solution and a manganese sulphate solution were mixed together such that the atomic ratio between nickel atoms, cobalt atoms and manganese atoms became 0.88:0.08:0.04.

The nickel-cobalt-manganese composite hydroxide 2, a lithium hydroxide monohydrate powder and a potassium sulfate powder were weighed such that Li/(Ni+Co+Mn)=1.20 and $K_2SO_4/(LiOH+K_2SO_4)$=0.10

(mol/mol), followed by mixing. The resulting was calcined in an oxygen atmosphere at 820° C. for 6 hours, thereby obtaining a lithium metal composite oxide powder. The obtained powder and pure water were mixed such that the mass ratio of the powder to the resulting mixture was 0.3, thereby obtaining a slurry. The slurry was stirred for 20 minutes, followed by dehydration, separation and drying at 105° C. to obtain a positive electrode active material 2.

2. Evaluation of Positive Electrode Active Material 2

The composition analysis of the positive electrode active material 2 was performed and the results were applied to the formula (I). As a result, it was found that x=0.02, y=0.08, z=0.04, and w=0.

The results of the SEM observation of the positive electrode active material 2 showed that the average particle diameter of the independently existing single particles was 3.0 μm, the average particle diameter of the secondary particles was 9.0 μm, and the average particle diameter of the primary particles constituting the secondary particles was 0.4 μm. With respect to the single particles in the positive electrode active material 2, the average crushing strength was 126 MPa, $(D_{90}-D_{10})/D_{50}$ was 1.9, and the float electricity was 7.68 mAh/g.

Example 3

1. Production of Positive Electrode Active Material 3

A positive electrode active material 3 was produced following the same procedure as in Example 2, except that the calcination temperature was changed to 760° C.

2. Evaluation of Positive Electrode Active Material 3

The composition analysis of the positive electrode active material 3 was performed and the results were applied to the formula (I). As a result, it was found that x=0.02, y=0.08, z=0.04, and w=0.

The results of the SEM observation of the positive electrode active material 3 showed that the average particle diameter of the independently existing single particles was 1.8 μm, the average particle diameter of the secondary particles was 8.0 μm, and the average particle diameter of the primary particles constituting the secondary particles was 0.3 μm. With respect to the single particles in the positive electrode active material 3, the average crushing strength was 102 MPa, $(D_{90}-D_{10})/D_{50}$ was 1.7, and the float electricity was 7.57 mAh/g.

Comparative Example 1

1. Production of Positive Electrode Active Material 4

A positive electrode active material 4 was produced following the same procedure as in Example 1, except that the $K_2SO_4$ was not added for the calcination of the positive electrode active material, and the calcination temperature was changed to 850° C.

2. Evaluation of Positive Electrode Active Material 4

The composition analysis of the positive electrode active material 4 was performed and the results were applied to the formula (I). As a result, it was found that x=0, y=0.20, z=0.20, and w=0.

The results of the SEM observation of the positive electrode active material 4 showed that there was no independently existing single particles. The average particle diameter of the secondary particles was 8.0 μm, and the average particle diameter of the primary particles constituting the secondary particles was 0.6 μm. $(D_{90}-D_{10})/D_{50}$ was 1.9, and the float electricity was 11.3 mAh/g.

Comparative Example 2

1. Production of Positive Electrode Active Material 5

A positive electrode active material 5 was produced following the same procedure as in Example 2, except that the $K_2SO_4$ was not added for the calcination of the positive electrode active material, and the calcination temperature was changed to 760° C.

2. Evaluation of Positive Electrode Active Material 5

The composition analysis of the positive electrode active material 5 was performed and the results were applied to the formula (I). As a result, it was found that x=0.01, y=0.08, z=0.04, and w=0.

The results of the SEM observation of the positive electrode active material 5 showed that there was no independently existing single particles. The average particle diameter of the secondary particles was 6.0 μm, and the average particle diameter of the primary particles constituting the secondary particles was 0.3 μm. $(D_{90}-D_{10})/D_{50}$ was 1.8, and the float electricity was 14.3 mAh/g.

Comparative Example 3

1. Production of Positive Electrode Active Material 6

A positive electrode active material 6 was produced following the same procedure as in Example 1, except that the $K_2SO_4$ was not added for the calcination of the positive electrode active material, and the calcination temperature was changed to 925° C.

2. Evaluation of Positive Electrode Active Material 6

The composition analysis of the positive electrode active material 6 was performed and the results were applied to the formula (I). As a result, it was found that x=−0.01, y=0.20, z=0.20, and w=0.

The results of the SEM observation of the positive electrode active material 6 showed that the average particle diameter of the independently existing single particles was 1.0 μm, the average particle diameter of the secondary particles was 5.0 μm, and the average particle diameter of the primary particles constituting the secondary particles was 0.4 μm. With respect to the single particles in the positive electrode active material 6, the average crushing strength was 71.9 MPa, $(D_{90}-D_{10})/D_{50}$ was 11.0, and the float electricity was 9.9 mAh/g.

The results of Examples 1 to 3 and Comparative Examples 1 to 3 are summarized in Table 1.

TABLE 1

| | x | 1−y−z−w | Y | z | w | Independently existing single particles | Particle strength (MPa) | $(D_{90}-D_{10})/D_{50}$ | Single Particle diameter (μm) | Float electricity (mAh/g) |
|---|---|---|---|---|---|---|---|---|---|---|
| Ex.1 | 0.02 | 0.60 | 0.20 | 0.20 | 0 | Contained | 127 | 1.2 | 2.0 | 7.66 |
| Ex.2 | 0.02 | 0.88 | 0.08 | 0.04 | 0 | Contained | 126 | 1.9 | 3.0 | 7.68 |
| Ex.3 | 0.02 | 0.88 | 0.08 | 0.04 | 0 | Contained | 102 | 1.7 | 1.8 | 7.57 |

TABLE 1-continued

| | x | 1−y−z−w | Y | z | w | Independently existing single particles | Particle strength (MPa) | $(D_{90} - D_{10})/D_{50}$ | Single Particle diameter (μm) | Float electricity (mAh/g) |
|---|---|---|---|---|---|---|---|---|---|---|
| Comp.Ex.1 | 0 | 0.60 | 0.20 | 0.20 | 0 | Not contained | — | 1.9 | — | 11.3 |
| Comp.Ex.2 | 0.01 | 0.88 | 0.08 | 0.04 | 0 | Not contained | — | 1.8 | — | 14.3 |
| Comp.Ex.3 | −0.01 | 0.60 | 0.20 | 0.20 | 0 | Contained | 71.9 | 11.0 | 1.0 | 9.9 |

The above results confirmed that the positive electrode active materials of Examples 1 to 3 according to the present invention react less with the electrolyte, resulting in less float electricity.

DESCRIPTION OF THE REFERENCE SIGNS

1 Separator
2 Positive electrode
3 Negative electrode
4 Electrode group
5 Battery can
6 Electrolytic liquid
7 Top insulator
8 Sealing body
Lithium secondary battery
21 Positive electrode lead
31 Negative electrode lead

The invention claimed is:

1. A lithium metal composite oxide powder comprising:
secondary particles that are aggregates of primary particles; and
single particles that are different from the secondary particles and the primary particles,
wherein the lithium metal composite oxide is represented by composition formula (I), and the single particles have an average crushing strength exceeding 80 MPa:

$$Li[Li_x(Ni_{(1-y-z-w)}Co_yMn_zM_w)_{1-x}]O_2 \quad (I)$$

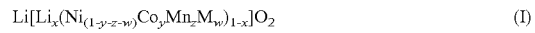

wherein M is one or more metal elements selected from the group consisting of Fe, Cu, Ti, Mg, Al, W, B, Mo, Nb, Zn, Sn, Zr, Ga, La and V, −0.1≤x≤0.2, 0≤y≤0.4, 0≤z≤0.4, and 0≤w≤0.1.

2. The lithium metal composite oxide powder according to claim 1, wherein in the composition formula (I), 0<x≤0.1 and 0<y≤0.4.

3. The lithium metal composite oxide powder according to claim 1, which has 90% cumulative volumetric particle diameter $D_{90}$, 10% cumulative volumetric particle diameter $D_{10}$, and 50% cumulative volumetric particle size $D_{50}$, which satisfy a ratio, $(D_{90}-D_{10})/D_{50}$, of less than 2.0.

4. The lithium metal composite oxide powder according to claim 1, wherein the single particles have an average particle diameter of 0.5 μm or more and 7 μm or less.

5. A positive electrode active material for a lithium secondary battery, comprising the lithium metal composite oxide powder of claim 1.

6. A positive electrode comprising a positive electrode active material of claim 5.

7. A lithium secondary battery comprising the positive electrode of claim 6.

8. The lithium metal composite oxide powder according to claim 1, wherein the single particles have the average crushing strength of more than 80 MPa and 400 MPa or less.

9. The lithium metal composite oxide powder according to claim 1, wherein an average particle diameter of the primary particles is 0.1 μm or more and less than 0.5 μm.

10. The lithium metal composite oxide powder according to claim 1, wherein M is one or more metal elements selected from the group consisting of Fe, Cu, Zn, Sn, Zr, Ga, and La, and 0<w≤0.1.

* * * * *